United States Patent
Park et al.

(10) Patent No.: US 7,701,735 B2
(45) Date of Patent: Apr. 20, 2010

(54) CONVERTER AND DRIVING METHOD THEREOF

(75) Inventors: Young-Bae Park, Anyang (KR); Gwan-Bon Koo, Bucheon (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 125 days.

(21) Appl. No.: 12/011,343

(22) Filed: Jan. 25, 2008

(65) Prior Publication Data

US 2008/0180973 A1    Jul. 31, 2008

(30) Foreign Application Priority Data

Jan. 26, 2007    (KR) ...................... 10-2007-0008300

(51) Int. Cl.
*H02M 3/335*    (2006.01)
(52) U.S. Cl. ................... 363/21.16; 363/21.13
(58) Field of Classification Search ............. 363/21.16, 363/21.17, 21.13
See application file for complete search history.

(56) References Cited

U.S. PATENT DOCUMENTS

| | | | | |
|---|---|---|---|---|
| 4,783,728 A | * | 11/1988 | Hoffman | 363/37 |
| 6,226,190 B1 | | 5/2001 | Balakrishnan | |
| 7,292,013 B1 | * | 11/2007 | Chen et al. | 323/222 |
| 7,414,865 B2 | * | 8/2008 | Yang | 363/21.16 |
| 2005/0276083 A1 | | 12/2005 | Berghegger | |

* cited by examiner

*Primary Examiner*—Shawn Riley
(74) *Attorney, Agent, or Firm*—Sidley Austin LLP (57) ABSTRACT

A converter and a driving method thereof are provided. The converter includes a main switch and a switching controller. The switching controller controls on/off of the main switch by using a first voltage corresponding to an output voltage and a first current flowing to the main switch. The switching controller determines a reference count according to the first voltage, and determines a peak value of the first current corresponding to a reference count and a switching frequency of the main switch.

20 Claims, 8 Drawing Sheets

CONVERTER AND DRIVING METHOD THEREOF

CROSS-REFERENCE TO RELATED APPLICATION

This application claims priority to and the benefit of Korean Patent Application No. 10-2007-0008300 filed in the Korean Intellectual Property Office on Jan. 26, 2007, the entire contents of which are incorporated herein by reference.

BACKGROUND

1. Field of the Invention

A converter and driving method thereof are provided. In particular, a converter for using a switch to convert an input DC voltage into an output DC voltage and controlling the switch to control the output DC voltage, and a driving method thereof.

2. Description of the Related Art

In general, a converter is a device for converting a DC input voltage into a DC output voltage with a different level. A converter can include a transformer and a main switch at the side of the primary coil of the transformer (the primary side), which receives the DC input voltage. The converter may also include a sensor to sense the DC output voltage generated by a secondary coil of the transformer. The main switch can be controlled according to the sensed output voltage, thereby controlling the output voltage itself. Conventionally, a feedback loop transmits the sensed output voltage or current to the primary side through an opto-coupler connected to the secondary coil of the transformer or a shunt regulator.

However, since the feedback loop utilizes expensive and large elements such as the opto-coupler or the shunt regulator, it is difficult to form the converter as an integrated circuit, thus reducing the cost.

Generally, there is a minimum turn-on time for the main switch in the converter due to a leading edge blanking, the turn-on/off of the main switch and the propagation delay. When a light load is connected to an output terminal of the converter, the turn-on time of the main switch may need to be short. In some cases this requirement may conflict with the minimum turn-on time. This can pose a challenge for optimizing the performance of the converter for light loads.

Further, the converter may reduce the switching frequency of the main switch below the audible frequency bandwidth. Such a low frequency may make the user of a device, which includes such a converter, feel uncomfortable.

The above information disclosed in this Background section is only for enhancement of understanding of the background and therefore it may contain information that does not form prior art.

SUMMARY

Briefly and generally, embodiments of the present invention include a converter with an accurate control system. Among others, embodiments do not generate noise at audible frequencies.

In some embodiments, a converter for using a primary side regulation method is provided. The method senses the voltage at the primary coil of the transformer to predict the output voltage, and uses the predicted output voltage to control the main switch.

In embodiments, a converter for converting an input voltage into an output voltage includes a main switch, and a switching controller for controlling the on/off of the main switch by using a first voltage corresponding to the output voltage and a first current flowing to the main switch, wherein the switching controller determines a reference count according to the first voltage, and determines a peak value of the first current corresponding to the reference count and a switching frequency of the main switch. The switching controller compares the first voltage and a predetermined reference voltage that is set so as to determine at least one of the switching frequency and the peak value of the first current, increases the reference count when the first voltage is greater than the reference voltage, and decreases the reference count when the first voltage is less than the reference voltage. The switching controller increases a center value of the reference count when the case in which the first voltage is greater than the reference voltage is repeated at least twice, and decreases the center value of the reference count when the case in which the first voltage is not greater than the reference voltage is repeated at least twice. The switching controller sets a center count for controlling the center value of the reference count, decreases the center count when the first voltage is greater than the reference voltage, and increases the center count when the first voltage is less than the reference voltage. The switching controller decreases the center value of the reference count when the center count is greater than a positive threshold value, and increases the center value of the reference count when the center count is less than a negative threshold value. The switching controller sets a relationship of the reference count and the peak value of the first current as a function, and determines the peak value of the first current according to the reference count. The reference count is a value that corresponds to a time when the main switch performs a switching operation once, and the switching frequency and the reference count are set according to a predetermined functional relationship. The switching controller includes a first controller for comparing the first current and the peak value of the first current decided by the reference count and determining the turn-off of the main switch, an output voltage detector for detecting the first voltage, and a second controller for comparing the first voltage and the reference voltage and controlling the reference count. The first controller includes: a reference current generator for determining a peak value of the first current corresponding to the reference count according to the function; an oscillator for generating clock signals; a first counter for receiving the clock signals to generate the reference count, and turning off the main switch when the reference count is greater than the number of clock signals corresponding to an on time; and a first comparator for comparing the peak value of the first current decided by the reference count and the first current and determining the turn-off of the main switch. The second controller includes: a second comparator for comparing the first voltage and the reference voltage, and generating a bang-bang control signal according to the comparison result; a second counter for counting the bang-bang control signal, and generating information on the comparison result of the first voltage and the reference voltage; and a corrector for controlling the center value of the reference count according to the comparison history result of the first voltage and the reference voltage, and changing the reference count according to the bang-bang control signal. The output voltage detector receives a gate control signal for controlling the main switch and a auxiliary winding voltage which is the ratio of corresponding to the voltage at the main switch, setting a sampling period for sampling the auxiliary winding voltage, and setting a voltage level of the auxiliary winding voltage, that is sampled with the last pulse from among a first pulse string within the sampling period by using a plurality of pulse strings including the first pulse string and a second pulse string including a plurality of pulses to be the first voltage. The converter further includes a voltage generator including a coil to which the winding voltage is applied according to the voltage at the main switch. The main switch is a transistor having a drain electrode and a source electrode as two electrodes and a gate electrode for receiving the gate control signal, and the first current flows from the drain electrode to the source electrode. The main switch and the switching controller are realized in a single chip.

In another aspect, a driving method by a converter including a main switch and that converts an input voltage into an output voltage according to switching of the main switch includes: counting clock signals to generate a first count when the main switch is turned on; comparing a first voltage corresponding to the output voltage and a reference voltage when the main switch is turned off, and changing a reference count according to the comparison result; counting the number of times that the first voltage is greater than the reference voltage or the number of times that the first voltage is not greater than the reference voltage, and controlling the medium value of the reference count according to the count history result; and determining a peak value of a first current flowing to the main switch corresponding to the reference count and determining a switching frequency according to the reference count. The comparing of a first voltage and a reference voltage and changing of a reference count according to the comparison result further includes increasing the reference count when the first voltage is greater than the reference voltage, and decreasing the reference count when the first voltage is less than the reference voltage. The driving method further includes detecting the first voltage when the main switch is turned off, turning on the main switch when the first count is greater than the reference count, and increasing the first counter when the first count is less than the reference count. The controlling of the reference count according to the count result includes increasing a center value of the reference count when the first voltage is greater than the reference voltage at least twice, and decreasing the center value of the reference count when the first voltage is less than the reference voltage at least twice. The determining of the peak value of the first current and the determining of the switching frequency includes determining the peak value of the first current corresponding to the reference count by using a function for indicating a relationship of the reference count and the peak value of the first current, and determining the switching frequency by using a function for indicating a relationship of the reference count and the switching frequency. The driving method further includes turning on the main switch and comparing the first current and the peak value of the first current, turning off the main switch when the first current is greater than peak value of the first current according to the comparison result of the first current and the peak value of the first current, and comparing and determining whether the first count is greater than the number of clock signals corresponding to the maximum on time of the main switch when the first current is less than the peak value of the first current according to the comparison result of the first current and the peak value of the first current.

DETAILED DESCRIPTION

In the following detailed description, only certain exemplary embodiments are shown and described, simply by way of illustration. As those skilled in the art realize, the described embodiments may be modified in various ways, all without departing from the spirit or scope of the present invention. Accordingly, the drawings and description are to be regarded as illustrative in nature and not restrictive.

Throughout this specification and the claims that follow, when it is described that an element is "coupled" to an other element, the element may be "directly coupled" to the other element or "electrically coupled" to the other element through a third element.

Figure 1:
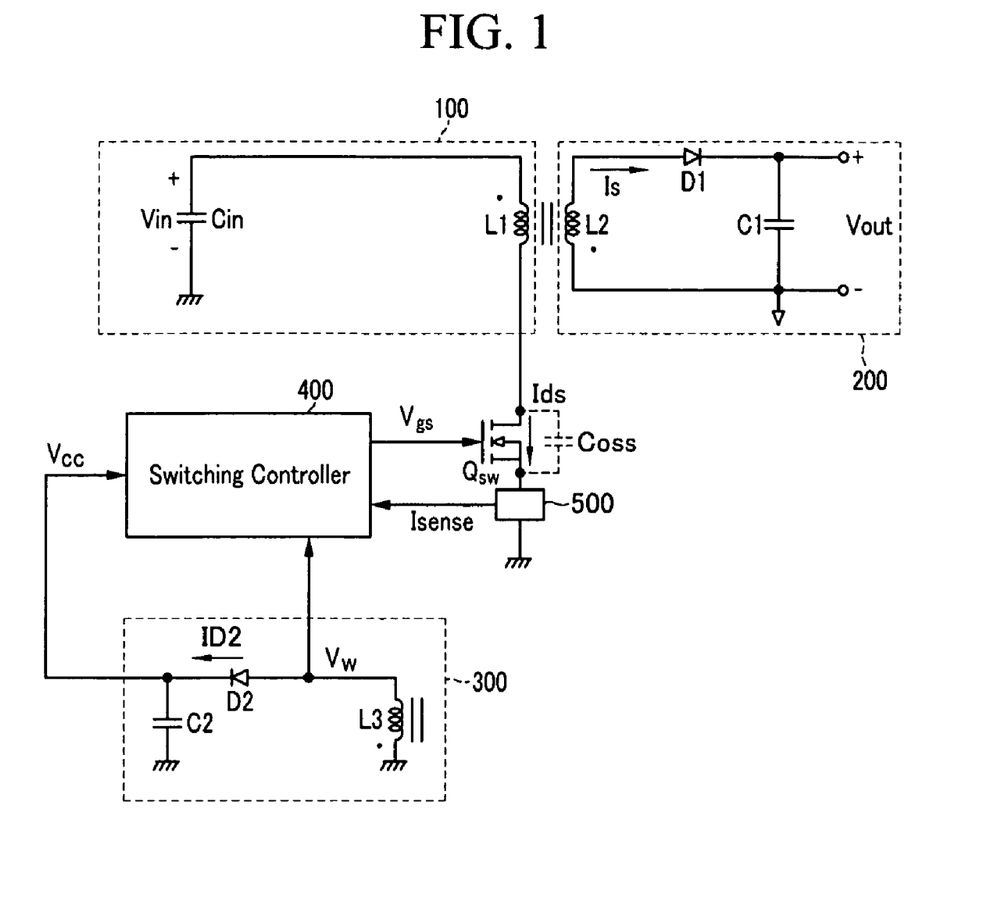
FIG. 1 shows a converter.

FIG. 1 shows a converter. The converter can include an input unit 100, an output unit 200, a voltage generator 300, a main switch Qsw, a switching controller 400, and a current sensor 500.

The input unit 100 can include a primary coil L1 of a transformer, receiving an input voltage Vin. The input unit 100 can supply energy to a secondary coil L2 of the transformer within the output unit 200 according to the switching of the main switch Qsw.

The output unit 200 can include the secondary coil L2 of the transformer, a diode D1 having an anode connected to a first terminal of the secondary coil L2 and a capacitor C1 coupled between a cathode of the diode D1 and a second terminal of the secondary coil L2. The capacitor C1 can smooth an output voltage Vout.

The voltage generator 300 may include an auxiliary coil L3 of the transformer, a diode D2 having an anode coupled to a first terminal of the auxiliary coil L3 and a capacitor C2 coupled between a cathode of the diode D2 and a ground. The switching controller 400 can be formed as an integrated circuit (IC).

The voltage generator 300 can supply a bias voltage Vcc for operating the switching controller 400. The bias voltage Vcc can be generated by the main switch Qsw repeatedly turning on/off. This induces a voltage in the auxiliary coil L3, which can then be used to charge the capacitor C2 through the diode D2. The voltage charged in the capacitor C2 can be applied as the bias voltage Vcc to the switching controller 400.

When a secondary current Is in the secondary coil L2 becomes zero after the main switch Qsw is turned off, the voltage generator 300 can generate an auxiliary voltage Vw for the switching controller 400. The auxiliary voltage Vw can be changed corresponding to a resonance voltage between all parasitic capacitances Coss at the main switch Qsw and the primary coil L1. The switching controller 400 may sense the voltage at the main switch Qsw by using the voltage signal Vw. The main switch Qsw can be an n-channel transistor having a drain electrode and a source electrode and a gate electrode as a control electrode. Other embodiments can include other types of power switching devices, including various Field Effect Transistors or junction transistors.

The current sensor 500 can sense a drain-source current Ids flowing through the main switch Qsw, generate a current Isense corresponding to the drain-source current Ids and transmit the current Isense to the switching controller 400.

The switching controller 400 can receive the auxiliary voltage Vw from the voltage generator 300 and the sense current Isense, and control the on/off state of the main switch Qsw accordingly. The detailed description of the switching controller 400 will be described referring to FIG. 2.

Figure 2:
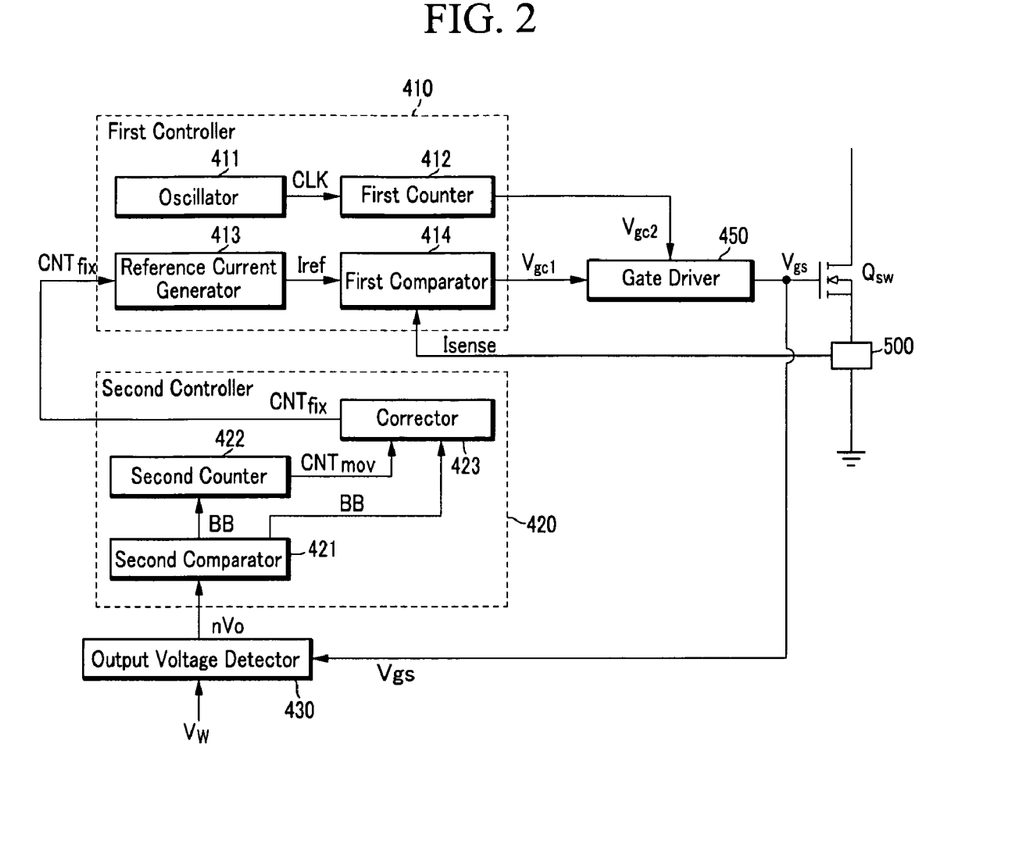
FIG. 2 shows a switching controller in detail.

FIG. 2 shows an embodiment of the switching controller 400. The switching controller 400 may include a first controller 410, a second controller 420, an output voltage detector 430, and a gate driver 450.

The first controller 410 may receive the sense current Isense to determine the on/off state of the main switch Qsw. The first controller 410 may include an oscillator 411, a first counter 412, a reference current generator 413, and a first comparator 414. The first controller 410 can compare the sense current Isense and a reference current Iref, and turn off the main switch Qsw when the sense current Isense becomes greater than the reference current Iref. The reference current Iref can be generated by the reference current generator 413, and it can be set according to the input power of the converter that is determined by the load connected to the output unit 200. The input power can change depending on whether the load connected to the output unit 200 increases or decreases. The input power also depends on a peak drain-source current of the main switch Qsw and a switching frequency fsw as expressed in Equation 1:

$$Pin = \frac{1}{2} Lm \cdot Iref^2 \cdot f_{sw} \quad (1)$$

Here Pin is an input power, and Lm is the inductance of the coil L1. The reference counter CNTfix can also influence the switching frequency fsw and the reference current Iref. The reference current Iref can have a predetermined functional relationship with the reference counter CNTfix. In Equation (1) the input power Pin can be determined by Iref. Iref can be changed corresponding to the reference counter CNTfix as described in relation to FIG. 3. Therefore, the input power Pin can be controlled by the reference counter CNTfix.

The reference current generator 413 may receive the reference counter CNTfix from the second controller 420, generate the reference current Iref corresponding to the reference counter CNTfix according to the predetermined functional relationship, and transmit the reference current Iref to the first comparator 414.

The predetermined functional relationship between the reference current Iref and the reference counter CNTfix can be determined by experimentation or by calculation.

The oscillator 411 may generate a clock signal CLK having a predetermined period and send the clock signal CLK to the first counter 412. The first comparator 414 may receive the sense current Is and determine whether to turn off the main switch Qsw according to the comparison of the sense current Isense and the reference current Iref. When the sense current Is exceeds the reference current Iref, the first comparator 414 may transmit a gate driver control signal Vgc1 to the gate driver 450 for turning off the main switch Qsw.

Also, when an "on-time" of the main switch Qsw passed, the first counter 412 may generate a gate driver control signal Vgc2 for the gate driver 450 for turning off the main switch Qsw. Vgc2 is the control signal to turn on the main switch Qsw and Vgc1 is the control signal to turn off the main switch Qsw and Vgc1 is the control signal to turn off the main switch Qsw. The main switch Qsw can be turned on by a falling edge timing or a rising edge timing of Vgc2. The main switch Qsw can be turned off by Vgc1 when Isense becomes essentially equal to Iref. In this case, the duty information of Vgc2 can be used to control a maximum turn on period of the main switch Qsw. Both gate driver control signals Vgc1 and Vgc2 can be applied to the gate driver 450. The first counter 412 can receive the clock signal CLK. The first counter 412 counts the clock signal CLK to generate a first count cnt. For example, the first counter 412 can generate a first count cnt starting when the main switch is turned on. The first counter 412 may compare this first count cnt to a predetermined on-time number Ton, representing the number of clock signals corresponding to a predetermined on-time. The on-time number Ton represents the number of clock signals during which the main switch Qsw is on during the switching operation. Ton can have any value below a maximum, set to protect the converter. The first counter 412 can determine that the on-time passed when the first count cnt exceeds the on-time number Ton. When the first counter 412 determined that the on-time passed, the first counter 412 can generate a corresponding gate driver control signals Vgc2 and apply it to the gate driver 450.

The main switch Qsw can be also turned off, when the on-time did not pass yet, but the sense current Isense exceeds the reference current Iref.

The second controller 420 can receive an output sense voltage nVo from the output voltage detector 430. The second controller 420 may generate the reference count CNTfix, applied to the reference current generator 413. The second controller 420 can include a second comparator 421, a second counter 422, and a corrector 423.

The second comparator 421 can receive the output sense voltage nVo from the output voltage detector 430, compare the output sense voltage nVo to a first reference voltage Vref, and applies a comparison signal to the second counter 422. The first reference voltage Vref can be set in a wide range. In particular, it can be set so that the switching frequency fsw may fall outside the audible frequency bandwidth. The comparison signal of the second comparator 421 may be a high-level bang-bang control signal BB, applied to the second counter 422 and to the corrector 423, when the output sense voltage nVo exceeds the first reference voltage Vref. The comparison signal of the second comparator 421 may be a low-level bang-bang control signal BB, applied to the second counter 422 and the corrector 423, when the output sense voltage nVo is less than the first reference voltage Vref. The bang-bang control signal BB can assume a logical value of 1 corresponding to the high level and a logical value of 0 corresponding to the low level. The second counter 422 can reduce a center count CNTmov when it receives a high-level bang-bang control signal BB. The second counter 422 can increase the center count CNTmov, when it receives a low-level bang-bang control signal BB. The center count CNTmov is generated to determine the center value of the reference count CNTfix. As an example, to generate a reference count CNTfix which varies in a range from 165 to 185 clock signals, the second counter 422 can generate a center count CNTmov corresponding to 175 clock signals and apply it to the corrector 423. The corrector 423 receives the center count CNTmov and generates a CNTfix signal centered around 175 clock signals. In some embodiments, the corrector 423 can compare the center count CNTmov to a threshold value, and change the center value of the reference count CNTfix when the center count CNTmov reaches the threshold value. In other embodiments, the corrector 423 can adjust the center value of the reference count CNTfix directly according to the center count CNTmov.

The corrector 423 can change not only the center of the range of the reference count CNTfix according to the center count CNTmov. The corrector 423 can also change the reference count CNTfix itself within this range. For example, the reference count CNTfix can be increased or decreased within the range between 165 and 185 clock signals according to the bang-bang control signal BB. The corrector 423 can increase the reference count CNTfix when it receives a high-level bang-bang control signal BB, and decrease the reference count CNTfix when it receives a low-level bang-bang control signal BB.

The corrector 423 can apply the reference count CNTfix to the first controller 410 when the center count CNTmov does not reach the threshold value. For example, when the center value of the reference count CNTfix is 175 clock signals and the second counter 422 receives a high-level bang-bang control signal BB ten times, the second counter 422 can change the center count CNTmov accordingly and apply it to the corrector 423. The corrector 423 receives the reduced center count CNTmov and determines that it reached a preset negative threshold value. At this time the corrector 423 changes the center value of the reference count CNTfix to e.g. 176 clock signals.

As an example, when the high-level bang-bang control signal BB is high, it may be necessary to decrease the input power Pin. The CNTfix can be increased to decrease the input power Pin. If it happened ten times that the high-level bang-bang control signal BB is high level, it may be necessary to increase the center value of the reference count CNTfix. To count the number of the cases that the high-level bang-bang control signal BB is high, the center count CNTmov can be decreased. When the center count CNTmov reaches the negative threshold value, the center value of the reference count CNTfix can be increased. To count the number of the cases that the high-level bang-bang control signal BB is high, the center count CNTmov can be increased. In this case, when the center count CNTmov reaches the positive threshold value, the center value of the reference count CNTfix can be increased.

In another example, if the second counter 422 receives a low-level bang-bang control signal BB ten times, the second counter 422 can increase the center count CNTmov and apply it to the corrector 423. The corrector 423 receives the increased center count CNTmov and determines that center count CNTmov reached a positive threshold value. In response, the corrector 423 can change the center value of the reference count CNTfix to 174 clock signals.

As described above, the reference current generator 413 can receive the reference count CNTfix, generate a reference current Iref corresponding to the reference count CNTfix, and apply the reference current Iref to the first comparator 414.

When the bang-bang control signal BB is sensed at least twice at the same level, the center value of the reference count CNTfix can be changed. When the reference count CNTfix is changed according to the bang-bang control signal BB, the value can be changed according to different units of clock signals other than the 10 clock depending on the functional relationship of the reference count CNTfix, the reference current Iref, and the switching frequency fsw. In a like manner, the center value of the reference count CNTfix can also be changed for another unit of clock signals other than the one clock signal depending on the functional relationship of the reference count CNTfix, the reference current Iref, and the switching frequency fsw. Accordingly, the input power is changed when the switching frequency fsw and the reference current Iref are changed according to the reference count CNTfix. Therefore, the input power can be accurately controlled by controlling the reference count CNTfix, and the switching frequency fsw can be prevented from the frequency bandwidth of audible noise by controlling the reference count CNTfix.

Figure 3:
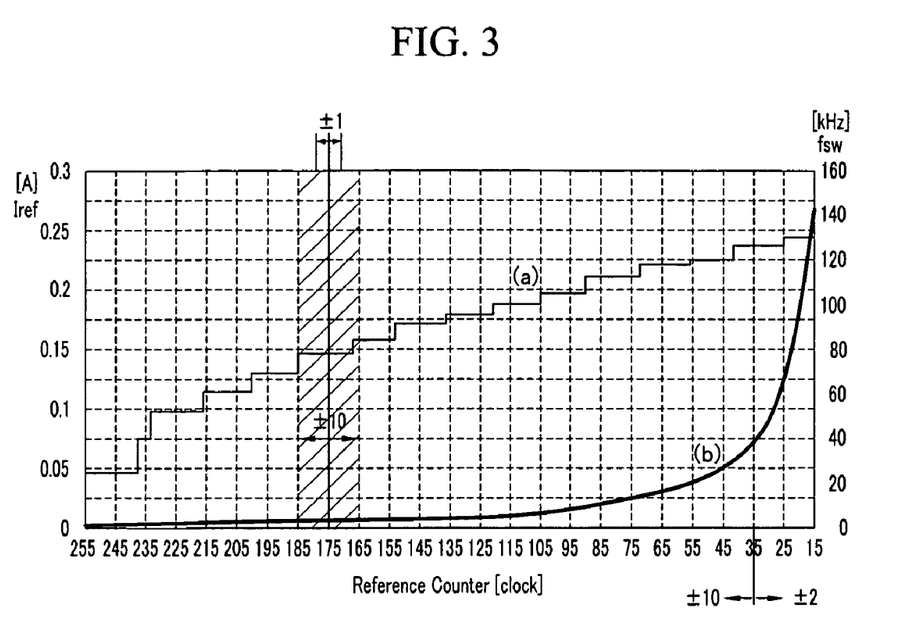
FIG. 3 shows a reference current and a switching frequency corresponding to a reference count.

FIG. 3 illustrates a method for controlling the input power, in relation to the reference current Iref and switching frequency fsw. In an example, when the center value of the reference count CNTfix is 175 clock, the reference count CNTfix is changed within the range from the 165 clock to the 185 clock according to the bang-bang control signal BB. In FIG. 3 the reference current Iref (trace (a)) increases in a staircase manner, as the reference count CNTfix is reduced. Trace (a) is an example for the above mentioned functional relation between the reference current Iref and the reference count CNTfix.

The switching frequency fsw (trace (b)) also increases, about inversely, with the decreasing reference count CNTfix. The reference count CNTfix is increased or decreased for the respective ten clocks according to the bang-bang control signal BB when the center value of the reference count CNTfix is greater than the 35 clock. The reference count CNTfix is increased or decreased for the respective two clocks according to the bang-bang control signal BB when the center value of the reference count CNTfix is less than the 35 clock.

In other embodiments the above numbers can be chosen differently. For example, the center count of CNTfix, separating the 10 and 2 repetitions, can be 45 clock signals instead of 35 clock signals. Also, the functional relation between the reference count CNTfix, the switching frequency fsw, and the reference current Iref shown in FIG. 3 is only one example. Many other functional relations can be used in embodiments, e.g. any relations, in which the switching frequency fsw decreases when the reference count CNTfix increases. Also, different embodiments use different relations between the reference current Iref and the reference count CNTfix, such as relations, in which the reference current Iref decreases when the reference count increases.

When the reference count CNTfix decreases from e.g. 175 clock signals to e.g. 165 clock signals, or the center value of the reference count CNTfix decreases, the switching frequency fsw and the reference current Iref can increase. In such embodiments, the input power of the converter increases and the output power increases accordingly. Analogously, when the reference count CNTfix increases, the output power decreases. Accordingly, in embodiments the output power can be controlled by changing the reference count CNTfix.

The reference current Iref and the sense current Isense are compared in first comparator 414, and the main switch Qsw is turned off when the sense current Isense exceeds the reference current Iref. Therefore, the peak value of the drain-source current Ids substantially corresponds to the reference current Iref.

The output sense voltage nVo is compared to the first reference voltage Vref by the second comparator 421 and the reference count CNTfix is changed according to the count signal so that the reference count CNTfix can be changed according to the load connected to the output unit 200.

The above-described converter and its driving method can control the peak value of the drain-source current Ids by using the reference current Iref and changes the reference count CNTfix according to the load to thereby control the reference current Iref and the switching frequency fsw. The case in which the output sense voltage nVo exceeds the first reference voltage Vref represents that a load connected to the output unit 200 is decreasing, and hence the output power may need to be reduced.

A decrease of a load, connected to the output unit 200, may disadvantageously increase the output voltage Vout. This can come about because a decrease of the load can decrease the load current as well. Since the output power is controlled to be essentially constant, this can increase the output voltage. The output sense voltage nVo can also increase according to the output voltage Vout. This can occur when the output sense voltage nVo exceeds the first reference voltage Vref. In this case the converter may need to reduce the output power.

The output power can be reduced by reducing the input power of the converter. The input power can be reduced by increasing the reference count CNTfix, thereby reducing the reference current Iref and the switching frequency fsw, since these are in inverse relationship. When the reference current Iref is reduced, the peak value of the drain-source current Ids is reduced and the input power of the converter is reduced. Therefore, the output power of the converter is reduced as well.

When the load connected to the output unit 200 increases, the output voltage Vout may decrease. This may be indicated by the output sense voltage nVo becoming less than the first reference voltage Vref. In such cases the output power may need to be increased. When the output sense voltage nVo is less than the first reference voltage Vref, the load connected to the output unit 200 is increased, and the output power must be increased. This can be achieved by increasing the input power of the converter, e.g. by reducing the reference counter CNTfix. This increases the reference current Iref and the switching frequency fsw because of their inverse relationship. When the reference current Iref increases, the peak value of the drain-source current Ids increases and the input power of the converter increases. Therefore, the output power of the converter increases.

Figure 4:
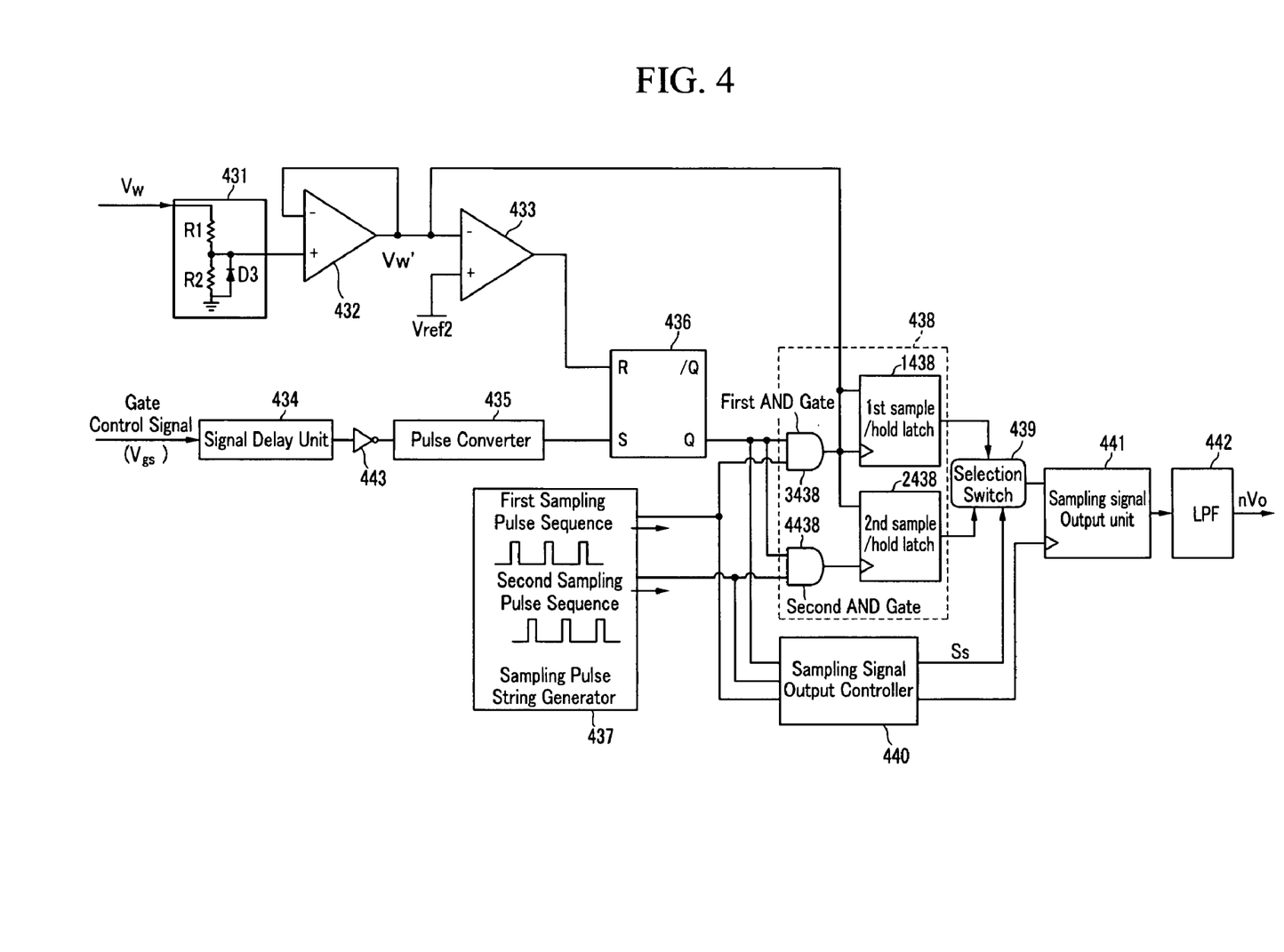
FIG. 4 shows an output voltage detector.
Figure 5:
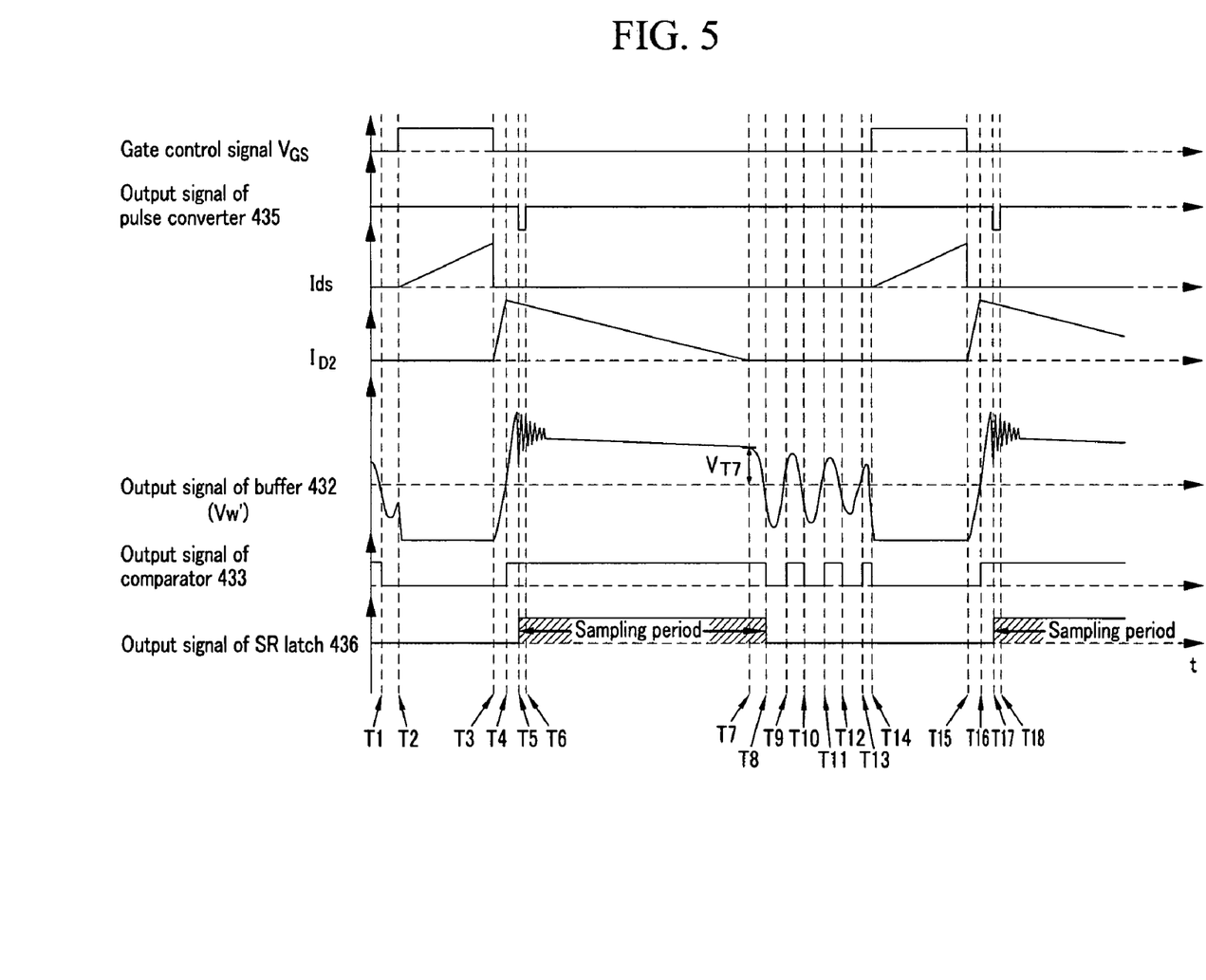
FIG. 5 shows waveforms of an input signal, an output signal, and a sampling signal of an output voltage detector.
Figure 6:
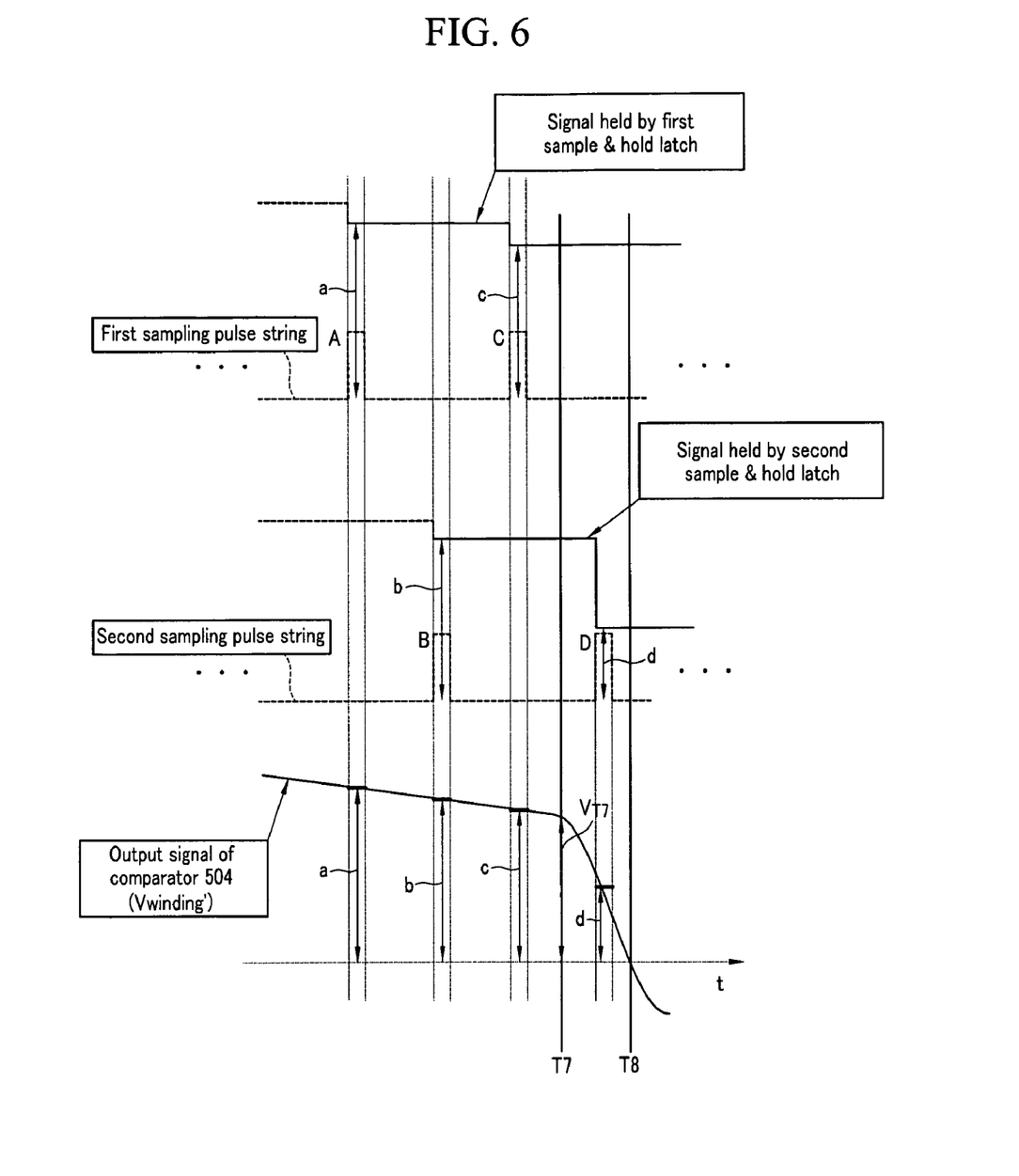
FIG. 6 shows a flowchart of a converter driving method.

FIGS. 4-6 illustrate an output voltage detector 430. Output voltage detector 430 may receive the auxiliary voltage Vw and a gate control signal Vgs, and generate a detection sense voltage nVo to the switching controller 400. Here, the output sense voltage nVo corresponds to the output voltage Vout of the output unit 200 of the converter and can be used to determine the turn-off time of the main switch Qsw.

The output voltage detector 430 may include a voltage divider 431, a buffer 432, a comparator 433, a signal delay unit 434, a pulse converter 435, an SR latch 436, a sampling pulse string generator 437, a sampling unit 438, a selection switch 439, a sampling signal output controller 440, a sampling signal output unit 441, a low pass filter 442, and an inverter 443.

The voltage divider 431 may include a resistor R1 with one terminal connected to the auxiliary voltage Vw, a resistor R2 with one terminal connected to a node shared with the other terminal of the resistor R1 and the other terminal connected to a ground, and a diode D3 with an anode connected to the ground and a cathode connected to the node shared by the resistors R1 and R2. The voltage divider 431 can scale down the auxiliary voltage Vw according to the ratio of the resistor R1 to the resistor R2 and output the scaled down signal to a non-inverting input terminal (+) of the buffer 432. The diode D3 may prevent a negative voltage from being applied to the non-inverting input terminal (+) of the buffer 432 if the level of the auxiliary voltage Vw is less than a predetermined value.

The buffer 432 may output its input signal without an impedance-related loss. The non-inverting input terminal of the buffer 432 may be connected to an output terminal of the voltage divider 431. The inverting input terminal may be connected to the output terminal of the buffer 432 to form a voltage follower to receive a feedback signal from the output terminal. Hereinafter, the output signal of the buffer 432 will be referred to as an auxiliary signal.

The comparator 433 can compare a magnitude of its input signal at the non-inverting input terminal to an input signal of its inverting input terminal, and output a digital signal of "1" or "0" according to the result of the comparison. If a signal, input at the non-inverting input terminal, exceeds a signal input at the inverting input terminal, the comparator 433 may output a "1" signal. If a signal, input at the non-inverting input terminal is smaller than a signal, input at the inverting input terminal, the comparator 433 may output a "0" signal. The inverting input terminal of the comparator 433 can be connected to an output terminal of the buffer 432, and the non-inverting input terminal can be connected to a reference voltage Vref2. Here, the reference voltage Vref2 can be set to a ground voltage or a voltage that is higher than the ground voltage by a predetermined amount.

The signal delay unit 434 may delay an input gate control signal Vgs by a predetermined time, and output the delayed signal. The inverter 435 may receive the output signal from the signal delay unit 434, invert the phase of the input signal, and transmit the resultant signal to the pulse converter 435.

The pulse converter 435 may generate a signal that has a short low level interval synchronized with a rising edge of the inverted gate control signal Vgs and that sustains a high level in the remaining interval.

A reset terminal R of the SR latch 436 can be connected to the output terminal of the comparator 433, and a set terminal S thereof to the output terminal of the pulse converter 435. The SR latch 436 can be formed with a NAND flip-flop or with any of the large number of other realizations. The SR latch can output a result of a logic operation to the sampling unit 438 and the sampling signal output controller 440 through the non-inverting output terminal Q.

The sampling pulse string generator 437 can include two pulse string generators, and can generate and output a first and a second sampling pulse strings that are toggled with different timing using the two pulse string generators. Here, a pulse string can be a pulse group that is continuously toggled with a predetermined frequency. In some embodiments the toggling can be piece-wise continuous.

The sampler 438 can include a first sample/hold latch 1438, a second sample/hold latch 2438, a first AND gate 3438, and a second AND gate 4438. The first AND gate 3438 and the second AND gate 4438 respectively may receive the output signal of the non-inverting output terminal Q of the SR latch 436 and one of the two sampling pulse strings output by the sampling pulse string generator 437, and perform an AND operation on them. The output terminal of the first AND gate 3438 can be connected to a sync signal input terminal of the first sample/hold latch 1438, thus controlling the sampling operation time of the first sample/hold latch 1438. The output terminal of the second AND gate 4438 may be connected to a sync signal input terminal of the second sample/hold latch 2438, thus controlling the sampling operation time of the second sample/hold latch 2438. The first and second sample/hold latches 1438 and 2438 are respectively driven by the output signals of the first AND gate 3438 and the output signal of the second AND gate 4438, and they sample the auxiliary signal output by the buffer 432 and hold the sampled signal until the next sync signal is input. The first and second sample/hold latches 1438 and 2438 respectively erase the auxiliary signal previous sampled and start holding the new auxiliary signal when a new sampling operation is started.

While in the shown embodiment the number N of sample and hold latches and AND gates is two, in other embodiments N can be more than two. Those embodiments also have N sampling pulse strings outputted by the sampling pulse string generator 437. Such embodiments can perform the sampling operation with more precise timing.

The selection switch 439 may receive a switching control signal from the sampling signal output controller 440 and auxiliary signals outputted by the plurality of sample and hold latches that are included in the sampling unit 438. The selection switch 439 can select and transfer the auxiliary signal held by a selected sample and hold latch to the sampling signal output unit 441.

The sampling signal output controller 440 can receive the output signal of the non-inverting output terminal Q of the SR latch 436 and the N sampling pulse strings of the sampling pulse string generator 437, and generate a switching control signal Ss and a timing signal for the sampling signal output unit 441. The switching control signal Ss can control the selection switch 439 in order to select one of output signals of the N sample and hold latches that are included in the sampling unit 438 and transfer the signal to the sampling signal output unit 441. The timing signal can control the driving timing of the sampling signal output unit 441.

The sampling signal output unit 441 receives one of the auxiliary signals that are output from one of the N sample and hold latches according to a switching operation of the selection switch 439, driven by the sampling signal output controller 440. The sampling signal output unit 441 can transfer the auxiliary signal to the low pass filter (LPF) 442. If a driving timing signal is applied by the sampling signal output controller 440, the sampling signal output unit 441 can change the auxiliary signal transferring from the sampling signal that has been being output, to the auxiliary signal that is input from the sampling unit 438 at the instance when the driving timing signal is applied, and output the new auxiliary signal to the low pass filter 442. Here, the sampling signal output unit 441 can hold an auxiliary signal that is received from the sampling unit 438 until a next driving timing signal is applied, and substantially continuously output a holding signal to the low pass filter 442.

The low pass filter 442 can prevent a signal that is output from the sampling signal output unit 441 from abruptly changing due to a level change of the auxiliary signal that is input from the sampling unit 438 to the sampling signal output unit 441 through the selection switch 439. In detail, when the auxiliary signal of the sampling signal output unit 441 changes abruptly—with high frequency components above a predetermined frequency—the low pass filter 442 can generate an approximately linearly changing signal by filtering out the high frequency components, and transfer the signal as the output sense voltage nVo to the second controller, labeled 420 in FIG. 2.

FIG. 5 illustrates output signals of buffer 432, comparator 433, pulse converter 435 and SR latch 436 in accordance with the change of Vgs, Isense and ID2. In what follows, the terminology "high" and "low" will be used. These terms were meant to make a connection to a digital terminology. In different embodiments the associated actual voltage may be different. Moreover, these high and low level signals may vary in time to some limited degree. In some embodiments they are only defined with a tolerance to be recognized as digital high and low signals.

The primary coil L1 of the transformer and the parasitic capacitor Coss between the drain and the source of the main switch Qsw can generate a resonant signal as the switching transistor Qsw is turned on and off substantially periodically. Because the primary coil L1 and the auxiliary coil L3 can share the core of the transformer, the auxiliary voltage Vw also follows a resonant waveform. Referring to FIG. 4, the auxiliary voltage Vw can be input into the voltage divider 431. The signal, output by the voltage divider 431 into the buffer 432, also follows a resonant waveform. At time T1 the output voltage of the buffer 432 sinks below a reference voltage. Therefore, at T1 the output signal of the comparator 433, which compares the reference voltage with the output signal of the buffer 432, changes from a high level to a low level. This output signal is input into the R terminal of the SR latch 436.

The gate control signal Vgs can be low at T1. The gate control signal Vgs can be transmitted to the signal delay unit 434, the inverter 443 and the pulse converter 435 into the S terminal of the SR latch 436. With this Vgs and according to its R and S input signals, the output signal at the non-inverting output terminal Q of the SR latch 436 is low.

At time T2, the gate control signal Vgs can change from low to high and therefore the main switch Qsw is turned on. The switching transistor Qsw turning on disrupts the resonance of the L1-Coss resonator and therefore the resonant waveform of the auxiliary voltage Vw and that of the output voltage of the buffer 432. The output voltage of the buffer 432 may go low to a predetermined level below the reference voltage Vref2. Further, at time T2 the drain-source current Ids may start to increase.

At time T3, the gate control voltage Vgs may go low, turning off the switching transistor Qsw. The output voltage of the buffer 432 then begins to rise. The current of the diode D2 (hereinafter referred to as ID2) begins to rise proportional to a voltage induced in the auxiliary coil L3 of the bias voltage supply unit 300.

At time T4, the output voltage of the buffer 432 may exceed a reference voltage Vref2, whereby the output signal of the comparator 433 changes from low to high. However, the output signal of the pulse converter 435 may not change because of the signal delay caused by the inverter 443 and the pulse converter 435. Therefore, the input signal at the S terminal of the SR latch 436 may not change either and thus the output at the non-inverting output terminal Q of the SR latch 436 does not change either. At this time T4 the current ID2 of the diode D2 may begin to decrease.

At time T5, the output signal of the pulse converter 435 can change from high to low, changing the input signal at terminal S of the SR latch 436 as well, causing the output signal of the non-inverting output terminal Q of the SR latch 436 to change from low to high.

At time T6, the output signal of the pulse converter 435 may change from low to high, while the input at the R terminal may remain high. Thus, the output signal of the non-inverting output terminal Q of the SR latch 436 can remain high.

At time T7, the current ID2, which decreased since the time T4, can reach approximately zero. This can restart the resonance of the primary coil L1 and parasitic capacitance Coss and hence the output voltage of the buffer 432.

At time T8, the output voltage of the buffer 432 may fall to (or below) the reference voltage Vref2 in the course of the resonant time dependence. Accordingly, the output signal of the comparator 433 can change from high to low, whereby an output signal of the non-inverting output terminal Q of the SR latch 436 changes to low.

In the subsequent time interval T9 to T13, the output voltage of the buffer 432 can repeatedly oscillate above and below the reference voltage Vref2, thus the output signal of the comparator 433 can repeatedly fluctuate between high and low. During this interval the output signal of the non-inverting output terminal Q of the SR latch 436 can remain low, because the S input remains high.

From time T14 the signals repeat the waveforms starting at T2.

Next, the generation of the output sense voltage nVo by the output voltage detector 430 of FIG. 2 will be described in detail during the time interval T3 to T8.

First, a drain-source voltage Vds, applied between the drain and the source of the switching transistor Qsw can approximately equal the sum of the input voltage Vin, applied across the capacitor Cin and the voltage induced in the primary coil L1 of the transformer.

As the main switch Qsw is turned off, a voltage of the parasitic capacitor Coss between a drain terminal and a source terminal of the switching transistor Qsw can increase until a direction of a current flowing through the primary coil L1 changes. As the direction of a current flowing through the primary coil L1 changes, resonance is generated between the /parasitic capacitor Coss and a inductance component of the primary coil L1 of the transformer, whereby the drain-source voltage Vds is resonated within a predetermined voltage range for a predetermined period.

As the switching transistor Qsw is turned off, a secondary, or output, voltage Vout can be generated in the secondary coil L2 of the transformer. The changing secondary voltage Vout can induce the secondary current Is to flow in the secondary coil L2. When the secondary current Is of the secondary coil L2 flows to the capacitor C1 via the diode D1, the secondary/output voltage Vout can fall. This decreasing secondary voltage Vout can induce a so-called "reflected" voltage Vo', reflected from the secondary coil L2 to the primary coil L1. The decreasing reflected voltage Vo' can cause the drain-source voltage Vds to fall. During this interval the voltage that is reflected from the secondary coil L2 to the primary coil L1 of the transformer is substantially the same as a sum of the voltage of the diode D1 and the voltage of the capacitor C1. The drain-source voltage Vds can fall in proportion to the secondary current Is flowing through the diode D1. When the secondary current Is becomes substantially zero, the drain-source voltage Vds may exhibit a resonant waveform because of the resonance of the primary coil L1 and the parasitic capacitor Coss. The resonance can start for example at time T7.

At time T7, the reflected voltage Vo' can be proportional to the output voltage Vout:

$$\frac{n_{PRIMARY}}{n_{SEC}} \cdot V_{out} = V_o' \quad (2)$$

where $n_{PRIMARY}$ is a number of windings of the primary coil L1 and NSEC is a number of windings of the secondary coil L2.

The drain-source Vds voltage at time T7 can be substantially the same as a sum of the input voltage Vin and the reflected voltage Vo'. The auxiliary voltage Vw that is induced in the coil L3 may be lower than drain-source voltage Vds by the input voltage Vin at time T7. At this time, the auxiliary voltage Vw can be proportional to a winding number ratio of the auxiliary coil L3 and the primary coil L1:

$$\frac{n_{PRIMARY}}{n_{VCC}} \cdot V_w = V_o' \quad (3)$$

where $n_{VCC}$ is a number of windings of the auxiliary coil L3 and Vo' is the voltage reflected from the coil L2 to the primary coil L1. The auxiliary voltage Vw can be proportional to the reflected voltage Vo'. The winding ratio of the coils L1, L2 and L3 is set by design. The auxiliary voltage Vw is proportional to the output voltage Vout through Equations (1)-(2).

The output voltage detector 430 may receive the auxiliary voltage Vw and the gate control signal Vgs, and output the output sense voltage nVo that corresponds to the auxiliary voltage Vw about the time T7. At the time T7, the current of the diode D1 is zero. Therefore, there is no forward voltage drop across diode D1 and Equation 1 captures the situation correctly at the time T7. At other times the auxiliary voltage Vw may not be exactly proportional to the output voltage because of the forward voltage drop of diode D1. The second controller 420 may receive the output sense voltage nVo. The second controller 420 can determine a reference count CNT-fix using the output sense voltage nVo. Within the full period of the switching transistor Qsw, the SR latch 436 can remain high in the time interval T5-T8. This time interval can be a sampling period in which at least one of the sample and hold latches of the sampling unit 438 samples the output signal of the buffer 432 whenever a signal level of the sampling pulse string that is input from the sampling pulse string generator 437 becomes high.

During the sampling period, the number of first and second sample and hold latches (such as 1438 and 2438) are driven according to a signal level of a sampling pulse string that is input to the first and second AND gates (such as 3438 and 4438) from one of the corresponding sampling pulse string generators (such as 437). During the sampling period, the first and second sample and hold latches can output an auxiliary signal, which is sampled within a toggling interval of the sampling pulse string.

The sample and hold latches (such as 1438 and 2438) typically hold only one sampling signal at a given time. Thus, when a next sampling signal is input, the sample and hold latches start holding the newly input sampling signal instead of keep holding the previous sampling signal.

The sampling signal output controller 440 can select one of the sampling signals that are held in the sample and hold latches (such as 1438 and 2438) during a sampling period, and output the signal to the sampling signal output unit 441 by controlling a switching operation of the selection switch 439.

At time T8, when an output signal of the non-inverting output terminal Q of the SR latch 436 may change from high to low, the sampling signal output controller 440 can sense that a sampling period ended. When the sampling period ends, the sampling signal output controller 440 may output the sampling signal of the corresponding sample and hold latch (1438 or 2438) to the sampling signal output unit 441 by connecting the selection switch 439 to an output terminal of the corresponding sample and hold latch, preceding the signal at time T8.

In the course of the above operation, the sampling signal output unit 441 can store information such as the number of sampling pulse string generators that are included in the sampling pulse string generator 437, an input order of sampling pulses that are input from the sampling pulse string generators, and the correspondence between the sample and hold latches and the sampling pulse string generators.

The sampling signal output controller 440 can have a number of sampling pulse string input terminals corresponding to the number of sampling pulse string generators, and receive the sampling pulse string that is output from each sampling pulse string generator through a different input terminal. The sampling signal output controller 440 can store a sampling pulse input order for receiving sampling pulses until the same number of sampling pulses are input as there are input terminals. The sampling signal output controller 440 may sense and input at an input terminal that sampling pulse which is immediately previous to the sampling pulse, immediately preceding time T8. In some embodiments sampling pulses which are close to, but not immediately previous to time T8, may be used. The sampling signal output controller 440 can determine which sample and hold latch holds the sampling signal corresponding to the sampling pulse that is immediately previous to a sampling pulse immediately preceding time T8, and transfer the holding signal of the sample and hold latch to sampling signal output unit 441 by controlling the selection switch 439. The sampling signal output unit 441 may output the signal as the output sense voltage nVo to the second controller 430 through the low pass filter 442. The sampling signal output controller 440 can control the selection switch 439 and simultaneously input a timing signal to the sampling signal output unit 441 for supplying the output sense voltage nVo to the second controller 420 as soon as possible. Here, similarly to the sample and hold latches 1438 and 2438 of the sampling unit 438, the sampling signal output unit 441 may hold only one sampling signal at a time, and output the sampling signal to the switching controller 400 until a next sampling signal is input. When a new sampling signal is input, the sampling signal output unit 441 may change the held sampling signal to the newly input sampling signal and output the new sampling signal to the second controller 420 through the low pass filter 442.

In some embodiments the output voltage detector 430 selects the sampling signal corresponding to the sampling pulse that is immediately previous of a sampling pulse preceding time T8, in order to select a voltage having the most similar level to the auxiliary signal at Time T7 (hereinafter, voltage VT7 refers to the voltage of the auxiliary signal at the time T7). It is not easy to detect the voltage VT7, because the time when the current ID2, flowing through the diode D2, becomes zero, is not easy to detect. As a resonance is initiated at about time T7, from the time T7 to the time T8 the auxiliary voltage may fall fast as illustrated in FIG. 5. If the output voltage detector 430 selects the sampling signal corresponding to the sampling pulse that immediately preceded time T8, the voltage detected as the output sense voltage nVo may considerably differ from the voltage VT7. On the other hand, the auxiliary voltage, which preceded time T7, is typically not considerably different from the voltage VT7. Therefore, in some embodiments the sampling signal corresponding to the sampling pulse that is immediately previous of a sampling pulse immediately preceding time T8 is selected to minimize the difference. This operation is illustrated in FIG. 6.

FIG. 6 illustrates signals held by first and second sample and hold latches 1438 and 2438 of the sampling unit 438 in accordance with the sampling signals. Here, the sampling signals of the sample and hold latches at four, closely spaced times, are labeled by a, b, c and d. These sampling signals are substantially equal to the auxiliary signal at the sampling times corresponding to the sampling pulses A, B, C and D, generated by the sampling pulse string generator 437. More specifically, sampling pulses A and C are part of the first sampling pulse string generated by the first pulse string generator, and sampling pulses B and D are part of the second sampling pulse string generated by the second pulse string generator. The sampling signals a, b, c and d are indicative of respective voltage levels of the auxiliary signal corresponding to the sampling pulses A, B, C and D.

At the time T8, the first sample and hold latch may hold the sampling signal c and the second sample and hold latch may hold the sampling signal d. Because the sampling pulse D lies within the time interval T7-T8, the sampling signal d corresponding to the sampling pulse D is considerably different from the voltage VT7. At the same time, since the sampling pulse C precedes time T7, the sampling signal c corresponding to the sampling pulse C is not considerably different from the voltage VT7. As the sampling signal output controller 440 transfers the sampling signal c to the sampling signal output unit 441 by controlling the selection switch 439, the output sense voltage nVo is nearly same as the voltage VT7. In some embodiments the sampling pulse D can exist even at the time T8. In these embodiments the sampling signal c corresponding to the sampling pulse C can be selected as a feedback voltage Vfb by the sampling signal output controller 440.

The switching controller 400 can determine the peak value of the drain-source current of the main switch Qsw and the switching frequency fsw by comparing the output sense voltage nVo to a predetermined value.

The switching controller 400 and the main switch Qsw can be realized as a single chip or can be realized as two separate chips.

Figure 7:
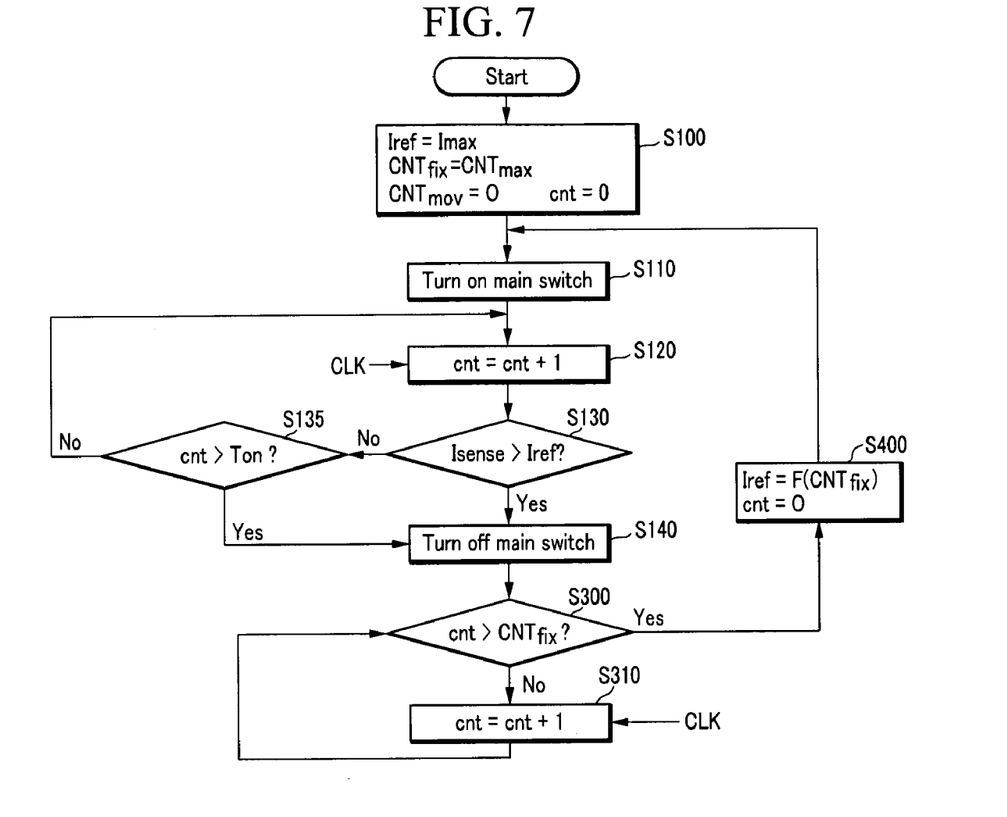
FIG. 7 shows a flowchart of a method operating the converter.

FIG. 7 shows a flowchart of a method operating the converter. In step S100 the first count cnt, the reference current Iref, the reference count CNTfix, and the center count CNTmov can be set. The converter may set the reference current Iref to have a maximum value of Imax, the reference count CNTfix to have a maximum value of CNTmax the first count cnt to be 0, and the center count CNTmov to be 0.

In step S110 the main switch Qsw can be turned on so that the converter transmits the input energy to the output unit 200.

In step S120 the first counter 412 can receive the clock signals CLK to increase the first count cnt.

In decision step S130 the first comparator 414 can compare the reference current Iref generated by the reference current generator 413 and the sense current Isense. Depending on the result of the comparison, the method proceeds through different steps.

In branch step S140, if the sense current Isense is found to exceed the reference current Iref in the decision step S130, the main switch Qsw can be turned off.

In branch decision step S135, if the sense current Isense is found to be less than the reference current Iref in the decision step S130, the first counter 412 may compare the first count cnt and an on-time Ton. If the first count cnt is found to exceed the on-time Ton in decision step S135, then Step S140 can be carried out: the main switch Qsw can be turned off. If the first count cnt is found to be less than the on-time Ton in decision step S135, then step S120 can be carried out: the first counter 412 may increase the first count cnt by using the clock signal.

In decision step S300 the first counter 412 may compare the first count cnt and the reference count CNTfix.

In branch step S400, if the first count cnt is found to exceed the reference count CNTfix in step S300, the current reference count CNTfix may be maintained. In addition, the reference current Iref, corresponding to the reference count CNTfix can be set according to a functional relationship Iref=F(CNTfix), and the first count can be reset e.g. to 0. After branch step S400 again step S110 can be performed.

In branch step S310, if the first count is found to be less than the reference count CNTfix in decision step S300, the first count cnt can be increased by counting the clock signals CLK and comparing the first count cnt and the reference count CNTfix.

Figure 8:
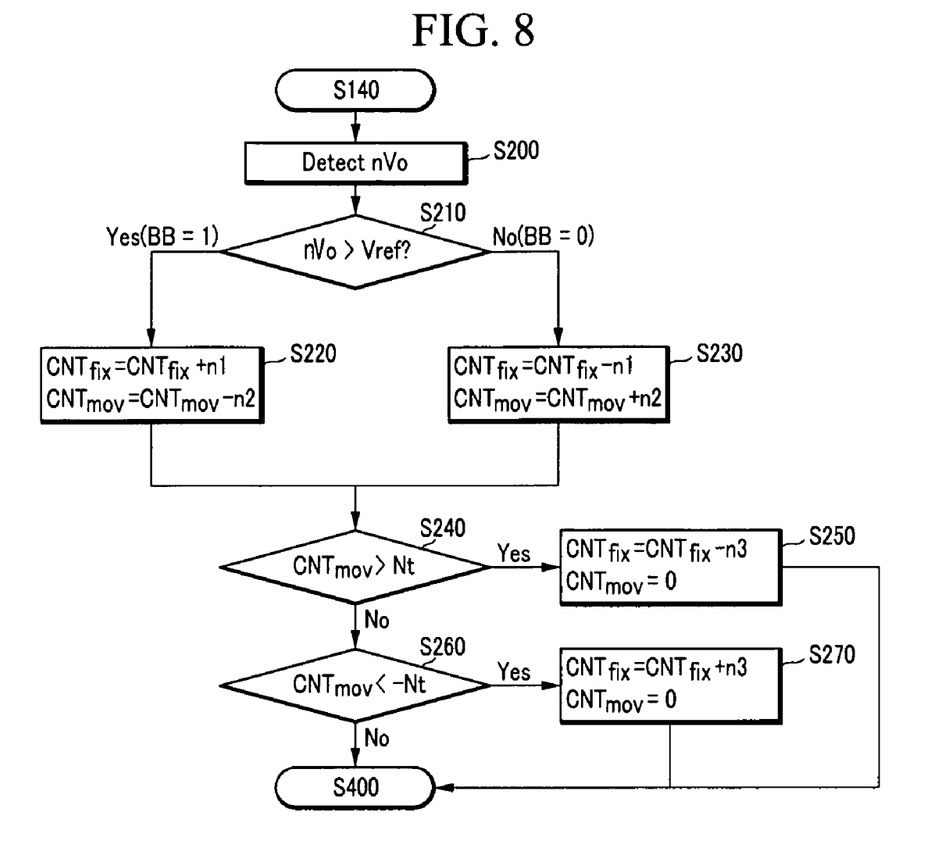
FIG. 8 shows a flowchart of a method of controlling the reference count CNTfix.

FIG. 8 shows a flowchart of a method of controlling the reference count CNTfix. In step S200 the output voltage detector 430 may detect the output sense voltage nVo.

In addition, in decision step S210 the second comparator 421 may compare the output sense voltage and the first reference voltage Vref.

In branch step S220, if the output sense voltage nVo is found to exceed the first reference voltage Vref in decision step S210, (i) the bang-bang control signal BB may be set to level 1, or high; (ii) the corrector 423 may increase the reference count CNTfix by n1 according to the bang-bang control signal BB; and (iii) the second counter 422 may decreases the center count CNTmov by n2.

In branch step S230, if the output sense voltage nVo is found to be less than the first reference voltage Vref in decision step S310, (i) the bang-bang control signal BB may be set to level 0, or low; (ii) the corrector 423 may decrease the reference count CNTfix by n1 according to the bang-bang control signal BB; and (iii) the second counter 422 may increase the center count CNTmov by n2.

In either case, in subsequent decision step S240, the corrector 423 may receive the changed center count CNTmov and proceed to determine whether the center counter is greater than a positive threshold value Nt.

In branch step S250, if the center count CNTmov is found to exceed the positive threshold value Nt in decision step S240, the reference count CNTfix is decreased by a value n3 to change the center value of the reference count CNTfix and reset the center count CNTmov to be 0. This branch step S250 can be followed by performing step S400.

In some embodiments, CNTmov is the count value to control the center value of the reference count CNTfix, but isn't the center value of the reference count CNTfix itself. CNTmov is the number to change according to the result of step S210.

In branch decision step S260, if the center count CNTmov is found to be less than the positive threshold value Nt in decision step 240, it is determined whether the center count CNTmov is less than a negative threshold value −Nt.

In branch step 270, if the center count CNTmov is found to be less than the negative threshold value −Nt in decision step 260, the reference count CNTfix can be increased by the value n3 to change the center value of the reference count CNTfix. Further, the center count CNTmov can be reset to 0. This branch step S270 can be followed by performing step S400.

If the center count CNTmov is found to exceed the negative threshold value −Nt in decision step 260, again step S400 may be performed.

The value of n1 can be selected so that the reference count CNTfix may be changed according to the comparison result of the output sense voltage nVo and the first reference voltage Vref. The value of n2 can be selected so that the center count CNTmov for determining the time for changing the center value of the reference count CNTfix may be changed according to the comparison result of the output voltage Vout and the first reference voltage Vref. The value of n3, i.e. the value for changing the center value of the reference count CNTfix, can be selected according to the center value of the current reference count CNTfix and the value of the reference count CNTfix.

As an example, when the current reference count CNTfix is 178 clock signals and the center value is 175 clock signals, the value of n3 can be selected to be 1 clock signal. In this case the center value of the reference count CNTfix will change to 174 clock signals when the center count CNTmov exceeds the positive threshold value. As an example, here the positive threshold value can be 10, and the CNTmov may assume the value of 11.

The branch steps S250 and S270 can be followed by performing step S400. In step S400 the corrector 423 can set the reference current Iref according to the reference count CNTfix by using a functional relationship. An example of the functional relationship is the equation Iref=F(CNTfix), as discussed above in relation to step S400. Also, the first count cnt can be reset to 0. The main switch Qsw is turned on according to the switching frequency fsw that is set according to the reference count CNTfix before a change, and the main switch Qsw is turned on according to the switching frequency fsw that is set according to the changed reference count CNTfix.

The above driving method of the converter determines the turn-off of the main switch Qsw according to the drain-source current Ids and changes the reference count CNTfix by using the output sense voltage nVo. The power input to the converter is accurately controlled according to the load connected to the output unit 200 by setting the reference current Iref and the switching frequency fsw according to the reference count CNTfix. This method can prevent the generation of noise in the audible frequency bandwidth by controlling the switching frequency fsw.

While the invention has been described in connection with specific embodiments, it is to be understood that the invention is not limited to the disclosed embodiments, but, on the contrary, is intended to cover various modifications and equivalent arrangements included within the spirit and scope of the appended claims.

What is claimed is:

1. A converter for converting an input voltage into an output voltage, comprising:
    a main switch; and
    a switching controller, configured to control a switching operation of the main switch by using a first voltage corresponding to the output voltage and a first current flowing to the main switch, wherein
    the switching controller is configured to determine a reference count according to the first voltage, and to determine a peak value of the first current corresponding to the reference count and a switching frequency of the main switch.

2. The converter of claim 1, wherein the switching controller is configured
    to compare the first voltage and a predetermined reference voltage, wherein the predetermined reference voltage is selected to control at least one of the switching frequency and the peak value of the first current;
    to increase the reference count when the first voltage is greater than the reference voltage; and
    to decrease the reference count when the first voltage is less than the reference voltage.

3. The converter of claim 2, wherein the switching controller is configured to increase a center value of the reference count when the case in which the first voltage is sensed to be greater than the reference voltage is repeated at least twice; and
    to decrease the center value of the reference count when the case in which the first voltage is sensed not to be greater than the reference voltage is repeated at least twice.

4. The converter of claim 3, wherein the switching controller is configured to set a center count for controlling the center value of the reference count;
    to decrease the center count when the first voltage is greater than the reference voltage; and
    to increase the center count when the first voltage is less than the reference voltage.

5. The converter of claim 4, wherein the switching controller is configured
    to decrease the reference count when the center count is greater than a positive threshold value; and
    to increase the reference count when the center count is less than a negative threshold value.

6. The converter of claim 3, wherein the switching controller is configured
to determine the peak value of the first current according to the reference count.

7. The converter of claim 6, wherein
the reference count is a value that corresponds to the time when the main switch performs a switching operation once; and
the switching frequency and the reference count are set according to a predetermined functional relationship.

8. The converter of claim 3, wherein the switching controller comprises:
a first controller, configured
to compare the first current and the reference current and to determine the turn-off of the main switch;
an output voltage detector, configured to detect the first voltage; and
a second controller, configured
to compare the first voltage and the reference voltage, and
to control the reference count.

9. The converter of claim 8, wherein the first controller comprises:
a reference current generator, configured to determine a peak value of the first current corresponding to the reference count according to the functional relationship;
an oscillator, configured to generate clock signals;
a first counter, configured to receive the clock signals to generate the reference count, and to turn off the main switch when the reference count is greater than the number of clock signals corresponding to an on-time; and
a first comparator, configured to compare the reference current and the first current and to determine the turn-off of the main switch.

10. The converter of claim 8, wherein the second controller comprises:
a second comparator, configured to compare the first voltage and the reference voltage, and to generate a bang-bang control signal according to the comparison result;
a second counter, configured to count the bang-bang control signal, and to generate information on the comparison result of the first voltage and the reference voltage; and
a corrector, configured to control the center value of the reference count according to the comparison result of the first voltage and the reference voltage, and to change the reference count according to the bang-bang control signal.

11. The converter of claim 1, wherein the output voltage detector is configured:
to receive a gate control signal for controlling the main switch and an auxiliary voltage corresponding to the voltage at the main switch;
to set a sampling period for sampling the winding voltage; and
to set a voltage level of the winding voltage, that is sampled with the last pulse from among a first pulse string within the sampling period by using a plurality of pulse strings including the first pulse string and a second pulse string including a plurality of pulses, to be the first voltage.

12. The converter of claim 11, further comprising
a voltage generator including a coil to which the auxiliary voltage is generated according to the voltage at the main switch.

13. The converter of claim 12, wherein
the main switch is a transistor having a drain electrode and a source electrode and a gate electrode, configured to receive the gate control signal, and the first current corresponds to a drain-source current, flowing from the drain electrode to the source electrode.

14. The converter of claim 1, wherein
the main switch and the switching controller are realized in a single chip.

15. A driving method of a converter including a main switch, for converting an input voltage into an output voltage according to a switching operation of the main switch, the driving method comprising the steps of
counting clock signals to generate a first count when the main switch is turned on;
comparing a first voltage, corresponding to the output voltage, and a reference voltage when the main switch is turned off, and changing a reference count according to the comparison result;
counting the number of times when the first voltage is greater than the reference voltage or the number of times when the first voltage is not greater than the reference voltage, and controlling the reference count according to the count result; and
determining a peak value of a first current flowing to the main switch corresponding to the reference count, and determining a switching frequency according to the reference count.

16. The driving method of claim 15, wherein comparing of a first voltage and a reference voltage and changing of a reference count according to the comparison result comprises:
increasing the reference count when the first voltage is greater than the reference voltage; and
decreasing the reference count when the first voltage is less than the reference voltage.

17. The driving method of claim 16, further comprising:
detecting the first voltage when the main switch is turned off;
turning on the main switch when the first count is greater than the reference count; and
increasing the first counter when the first count is less than the reference count.

18. The driving method of claim 15, wherein controlling of the reference count according to the count result comprises
increasing a center value of the reference count when the first voltage is greater than the reference voltage at least twice, and decreasing the center value of the reference count when the first voltage is less than the reference voltage at least twice.

19. The driving method of claim 15, wherein
determining of the peak value of the first current and determining of the switching frequency includes:
determining the peak value of the first current corresponding to the reference count by using a function for indicating a relationship of the reference count and the peak value of the first current, and determining the switching frequency by using a function for indicating a relationship of the reference count and the switching frequency.

20. The driving method of claim 15, further comprising:
turning on the main switch, and comparing the first current and the peak value of the first current;
turning off the main switch when the first current is greater than a peak value of the first current according to the comparison result of the first current and the peak value of the first current; and
comparing and determining whether the first count is greater than the number of clock signals corresponding to the on time of the main switch when the first current is less than the peak value of the first current according to the comparison result of the first current and the peak value of the first current.

* * * * *